US010399586B1

(12) United States Patent
Huang (10) Patent No.: US 10,399,586 B1
(45) Date of Patent: Sep. 3, 2019

(54) PORTABLE FOLDING WAGON

(71) Applicant: XIAMEN ROADZUP OUTDOOR PRODUCTS CO., LTD., Xiamen (CN)

(72) Inventor: Changjiu Huang, Xiamen (CN)

(73) Assignee: XIAMEN ROADZUP OUTDOOR PRODUCTS CO., LTD., Xiamen (CN)

( * ) Notice: Subject to any disclaimer, the term of this patent is extended or adjusted under 35 U.S.C. 154(b) by 0 days.

(21) Appl. No.: 16/045,150

(22) Filed: Jul. 25, 2018

(30) Foreign Application Priority Data

Apr. 8, 2018 (CN) .......................... 2018 1 0305907

(51) Int. Cl.
*B62B 3/02* (2006.01)
*B62B 3/00* (2006.01)
*B62B 5/06* (2006.01)

(52) U.S. Cl.
CPC .............. *B62B 3/025* (2013.01); *B62B 3/001* (2013.01); *B62B 3/002* (2013.01); *B62B 5/06* (2013.01); *B62B 2205/02* (2013.01); *B62B 2205/06* (2013.01); *B62B 2301/044* (2013.01)

(58) Field of Classification Search
CPC .. B62B 3/02; B62B 3/022; B62B 5/06; B62B 3/04; B62B 2202/404
See application file for complete search history.

(56) References Cited

U.S. PATENT DOCUMENTS

| | | | |
|---|---|---|---|
| 9,073,564 B2 | 7/2015 | Yang et al. | |
| 9,211,897 B2* | 12/2015 | Yang | B62B 3/02 |
| 9,738,298 B1* | 8/2017 | Yang | B62B 3/025 |
| 10,040,470 B1* | 8/2018 | Horowitz | B62B 5/0013 |
| 2016/0347338 A1* | 12/2016 | Vargas, II | B62B 3/02 |
| 2018/0327011 A1* | 11/2018 | Horowitz | B62B 3/02 |

FOREIGN PATENT DOCUMENTS

| | | |
|---|---|---|
| CN | 103587562 A | 2/2014 |
| CN | 103895672 A | 7/2014 |

* cited by examiner

*Primary Examiner* — James A Shriver, II
*Assistant Examiner* — James J Triggs
(74) *Attorney, Agent, or Firm* — Rabin & Berdo, P.C.

(57) ABSTRACT

A portable folding wagon includes a wagon frame with a folding frame and wheels. The folding frame has four scissor mechanisms, each mechanism has at least a scissor unit. The top portions of two adjacent scissor mechanisms are rotatably connected by a top connecting base, the bottom portions are rotatably connected by a bottom connecting base; the bottom connecting base is rotatably connected to a support rod, the bottom connecting base is disposed with a through hole, the top periphery of the through hole of the bottom connecting base extends upwardly to form a surrounding wall for the support rod to pass through, the bottom end of the support rod passes through the surrounding wall and the through hole and connects to the wheel, the top end of the support rod is rotatably connected to a sliding connecting piece, the sliding connecting piece is slidably connected to the scissor unit.

12 Claims, 9 Drawing Sheets

PORTABLE FOLDING WAGON

TECHNICAL FIELD

The present invention relates to a portable folding wagon.

RELATED ART

Existing portable folding wagons, for example disclosed in the publishing numbers of CN201210293571.X, CN201210572499.4 and U.S. Pat. No. 9,073,564B2, comprises a wagon frame, which comprises a folding frame and wheels. The folding frame comprises four scissor mechanisms surrounding in a rectangle and four flexible pipes. The scissor mechanism comprises at least one scissor unit, the top portions of each two adjacent scissor mechanism are rotatably connected by a top connecting base, the bottom portions are rotatably connected by a bottom connecting base; the top end of the flexible pipe is fixedly connected to the top connecting base, the bottom end fixedly passes through the bottom connecting base. The wheels are assembled to the bottom end of the flexible pipes. Existing portable folding wagons have disadvantages: firstly, the flexible pipes of the folding frame always keep in vertical state that they are subjected to torque during the folding, unfolding and being pulled, resulting in a shortened service life of the folding frame; secondly, the flexible pipe comprises two pipes that they use much material and cost much; thirdly, the flexible pipe might stack one's hand during the unfolding, so the usage security of the products need improvement.

SUMMARY OF THE INVENTION

The present invention is provided with a portable folding wagon to overcome the disadvantages of the existing known technology.

The technical solution of the present invention is that:

A portable folding wagon, comprising a wagon frame, the wagon frame comprises a folding frame and wheels, the folding frame comprises four scissor mechanisms surrounding in a rectangle, the scissor mechanism comprises at least a scissor unit, the top portions of two adjacent scissor mechanisms are rotatably connected by a top connecting base, the bottom portions are rotatably connected by a bottom connecting base; wherein the bottom connecting base is rotatably connected to a support rod, the bottom connecting base is disposed with a through hole, the top periphery of the through hole of the bottom connecting base extends upwardly to form a surrounding wall for the support rod to pass through, the bottom end of the support rod passes through the surrounding wall and the through hole and connects to the wheel, the top end of the support rod is rotatably connected to a sliding connecting piece, the sliding connecting piece is slidably connected to the scissor unit of the scissor mechanism.

In another preferred embodiment, the scissor unit comprises two linkage rods with the central portion rotatably connected; The four scissor mechanisms are two first scissor mechanisms spaced arranged left and right and two second scissor mechanisms spaced arranged front and back; the top portion of the linkage rod of the scissor unit of the first scissor mechanism corresponding to the corner of the rectangle is slidably connected to the sliding connecting piece.

In another preferred embodiment, the top connecting base comprises two top rotating joints arranged in a right angle, the two top rotating joints are respectively rotatably connected to the top end of one linkage rod of the first scissor mechanism and the top end of one linkage rod of the second scissor mechanism; the bottom connecting base comprises two first bottom rotating joints arranged in a right angle; the two first bottom rotating joints are respectively rotatably connected to the bottom end of one linkage rod of the first scissor mechanism and the bottom end of one linkage rod of the second scissor mechanism.

In another preferred embodiment, the top end of the support rod is fixedly disposed with a fixing base, the fixing base is disposed with a lug, the lug is rotatably connected to the sliding connecting piece, the top end of the lug is disposed on the top surface of the fixing base, a gap is formed between the top connecting base and the top surface of the fixing base when the folding frame is unfolded.

In another preferred embodiment, the first scissor mechanism comprises at least two scissor units arranged front and back, the second scissor mechanism comprises at least one scissor unit.

In another preferred embodiment, the lower portions of two adjacent scissor units of the first scissor mechanism are rotatably connected by a first central connecting base, while the top portions are rotatably connected by a second central connecting base; the folding frame further comprises a bottom frame, the bottom frame comprises radial mechanisms arranged front and back with the same number as the scissor units of the first scissor mechanism, the radial mechanism comprises a central base and four bottom rods rotatably connected to the central base, the end of the bottom rod of the radial mechanism is rotatably connected to the first central connecting base or the bottom connecting base correspondingly.

In another preferred embodiment, the first central connecting base is connected to the end of one bottom rod of two adjacent radial mechanisms at the same time.

In another preferred embodiment, the first central connecting base comprises two second bottom rotating joints and two central rotating joints, the two second bottom rotating joints are respectively rotatably connected to the bottom portion of one linkage rod of two adjacent scissor units, the two central rotating joints are respectively rotatably connected to the end of one bottom rod of two adjacent radial mechanisms.

In another preferred embodiment, the two second bottom rotating joints are arranged with space right and left, the two central rotating joints are fixedly disposed at one side of one second bottom rotating joints and formed splayed.

In another preferred embodiment, further comprising a pull bar, the second scissor mechanism comprises a scissor unit, two linkage rods of the scissor unit of one of the two second scissor mechanisms are connected by a position base, the position base is disposed with a first position groove; the pull rod mechanism comprises a first pull rod, a second pull rod rotatably connected to the first pull rod and a second position groove, the first pull rod is rotatably connected to the position base, the second pull rod, the first position groove and the second position groove are coupled in shape.

In another preferred embodiment, the pull rod mechanism comprises two first pull rods, a second pull rod and an assembly base, the two first pull rods are arranged with space; one end of the two first pull rods are rotatably connected to the position base, while the other end of the two first pull rods are fixedly connected by the assembly base; the second pull rod is rotatably connected to the assembly base, the second position groove is disposed at the assembly base.

Compared to the existing known technology, the present invention has advantages as follows:

The bottom connecting base is disposed with a through hole, the support rod passes through the through hole, the support rod is further rotatably connected to the bottom connecting base, the bottom connecting base is rotatably connected to a support rod, the bottom end of the support rod passes through the surrounding wall and the through hole and connects to the wheel, the top end of ht support rod is rotatably connected to a sliding connecting piece, the sliding connecting piece is slidably connected to the scissor unit of the scissor mechanism. It brings following effects: firstly, the top end of the support rod is connected to the scissor unit by the sliding connecting piece, the moving connecting of the support rod and the scissor unit can absorb or partially absorb the torque of the support rod during the folding, unfolding or walking; secondly, the top end of the support rod is connected to the scissor unit by the sliding connecting piece, so the folding and unfolding are convenient and labor saving; thirdly, with the support rods, the material and the material cost are reduced; fourthly, the hand would not be stuck during the folding and unfolding, the usage security is enhanced; fifthly, the structure is compact and convenient to assemble, the connecting strength of the support rod and the bottom connecting base is enhanced.

The folding frame further comprises a bottom frame, the bottom frame comprises radial mechanisms arranged front and back with the same number as the scissor units of the first scissor mechanism, the radial mechanism comprises a central base and four bottom rods rotatably connected to the central base, the end of the bottom rod of the radial mechanism is rotatably connected to the first central connecting base or the bottom connecting base correspondingly, each first central connecting base is connected to the radial mechanism, avoiding the central portion of the first scissor mechanism shaking or swing and improving the solidity of the support of the bottom portion.

The first central connecting base is connected to the end of one bottom rod of two adjacent radial mechanisms at the same time, the structure is simplified and the solidity is improved.

The first central connecting base comprises fixedly connected two second bottom rotating joints and two central rotating joints, the structure is simplified and the solidity is improved.

The pull rod mechanism comprises a first pull rod, a second pull rod rotatably connected to the first pull rod and a second position groove, the first pull rod is rotatably connected to the position base, the second pull rod, the first position groove and the second position groove are coupled in shape. The product has compact structure after being folded, and it occupies small size.

The pull rod mechanism comprises two first pull rods, a second pull rod and an assembly base, the two first pull rods are arranged with space; one end of the two first pull rods are rotatably connected to the position base, while the other end of the two first pull rods are fixedly connected by the assembly base; the second pull rod is rotatably connected to the assembly base, the second position groove is disposed at the assembly base. The connecting is solid and stable.

BRIEF DESCRIPTION OF THE DRAWINGS

The present invention will be further described in accordance with the drawings and the embodiments.

DETAILED DESCRIPTION OF THE EMBODIMENTS

The portable folding wagon, as figured in FIGS. 1-10, comprises a wagon frame A, the wagon frame A comprises a folding frame A1, wheels 20 and a pull rod mechanism 30.

The folding frame A1 comprises four scissor mechanisms surrounding in a rectangle and a bottom frame. The folding frame A1 is foldable to be in a folding state or unfolding state.

The four scissor mechanism comprises two first scissor mechanisms 11 arranged left and right and two second scissor mechanisms 12 arranged front and back. The first scissor mechanism 11 comprises two scissor units arranged front and back; the second scissor mechanism 12 comprises a scissor unit; but the numbers of the scissor units of the first and second scissor mechanisms are not limited. The top portions of each two adjacent scissor mechanisms are rotatably connected by a top connecting base and the bottom portions are rotatably connected by a bottom connecting base, forming a sleeve frame with a rectangle top view. The scissor unit comprises two linkage rods 15 with the central portions rotatably connected.

In a detailed structure, the top connecting base 13 comprises two top rotating joints arranged in a right angle, the two top rotating joints are respectively rotatably connected to the top end of one linkage rod 15 of the first scissor mechanism 11 and the top end of one linkage rod 15 of the second scissor mechanism 12; the bottom connecting base 14 comprises two first bottom rotating joints arranged in a right angle; the two first bottom rotating joints are respectively rotatably connected to the bottom end of one linkage rod 15 of the first scissor mechanism 11 and the bottom end of one linkage rod 15 of the second scissor mechanism 11. The lower portions of the linkage rods 15 of each two adjacent scissor units of the first scissor mechanism 11 are rotatably connected by a first central connecting base 181, while the top portions are rotatably connected by a second central connecting base 182.

Each bottom connecting base 14 is rotatably connected to a support rod 16; the bottom end of the support rod 16 passes through the bottom connecting base 14 and the bottom end is connected with the wheel 20; the top end of the support rod 16 is rotatably connected to a sliding connecting piece 17, which is slidably connected to the linkage rod 15 of the scissor unit of the first scissor mechanism 11.

Figure 10:
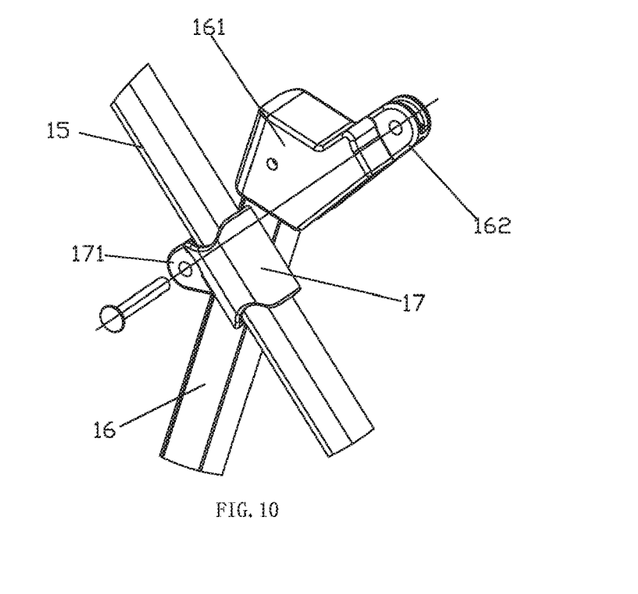
FIG. 10 illustrates an enlargement diagram of A of FIG. 4.

The bottom connecting base 14 is disposed with a through hole, the top periphery of the through hole of the bottom connecting base extends upwardly to form a surrounding wall 141, the support rod 16 passes through the surrounding wall 141 and the through hole. A pivot shaft passes through the surrounding wall 141 and the support rod 16 to rotatably connect the support rod 16 and the bottom connecting base 14; the bottom end of the support rod is assembled with a wheel rack 21, the wheel 20 is assembled to the wheel rack 21. The sliding connecting piece 17 is protruding with a first lug 171; the top end of the support rod 16 is fixedly disposed with a fixing base 161, and the fixing base is disposed with a second lug 162 arranged upwardly inclined; the second lug 162 is rotatably connected to the first lug of the sliding connecting piece 17; the top end of the second lug 162 is disposed above the top surface of the fixing base 161 and when the folding frame is disposed in unfolding state, a gap A2 is formed between the top connecting base 13 and the top surface of the fixing base 161 for user's hand to place for conveniently folding and unfolding and avoiding stuck; the sliding connecting piece 17 is slidably connected to the top portion of the linkage rod 15 of the scissor unit of the first scissor mechanism 11 in the corner of the rectangle; the top connecting base 13 forms a limit mechanism restricting the sliding connecting piece on sliding upwardly; when the sliding connecting piece 17 abuts against the top connecting base 13, the folding frame is in unfolding state.

The bottom frame comprises radial mechanisms 19 arranged front and back with the same number as the scissor units of the first scissor mechanism 11, the radial mechanism 19 comprises a central base 191 and four bottom rods 192 rotatably connected to the central base 191, the end of the bottom rod 192 of the radial mechanism 19 is rotatably connected to the first central connecting base 181 or the bottom connecting base 14 correspondingly. In detailed, the first central connecting base 181 is connected to the end of one bottom rod 192 of two adjacent radial mechanisms 19 at the same time. Two bottom rods 192 of one radial mechanism 19 are respectively rotatably connected to the two bottom connecting bases 14, two bottom rods 192 of the other radial mechanism 19 are respectively rotatably connected to the other two bottom connecting bases 14 the other bottom rods 192 of the radial mechanism 19 are rotatably connected to the first central connecting base 181; the first central connecting base 181 comprises fixedly connected two second bottom rotating joints and two central rotating joints 183, the two second bottom rotating joints are respectively rotatably connected to the bottom portion of one linkage rod 15 of two adjacent scissor units, the two central rotating joints 183 are respectively rotatably connected to the end of one bottom rod 192 of two adjacent radial mechanisms 19. The two second bottom rotating joints are arranged with space right and left, the two central rotating joints are fixedly disposed at one side of one second bottom rotating joints and formed splayed.

Figure 1:
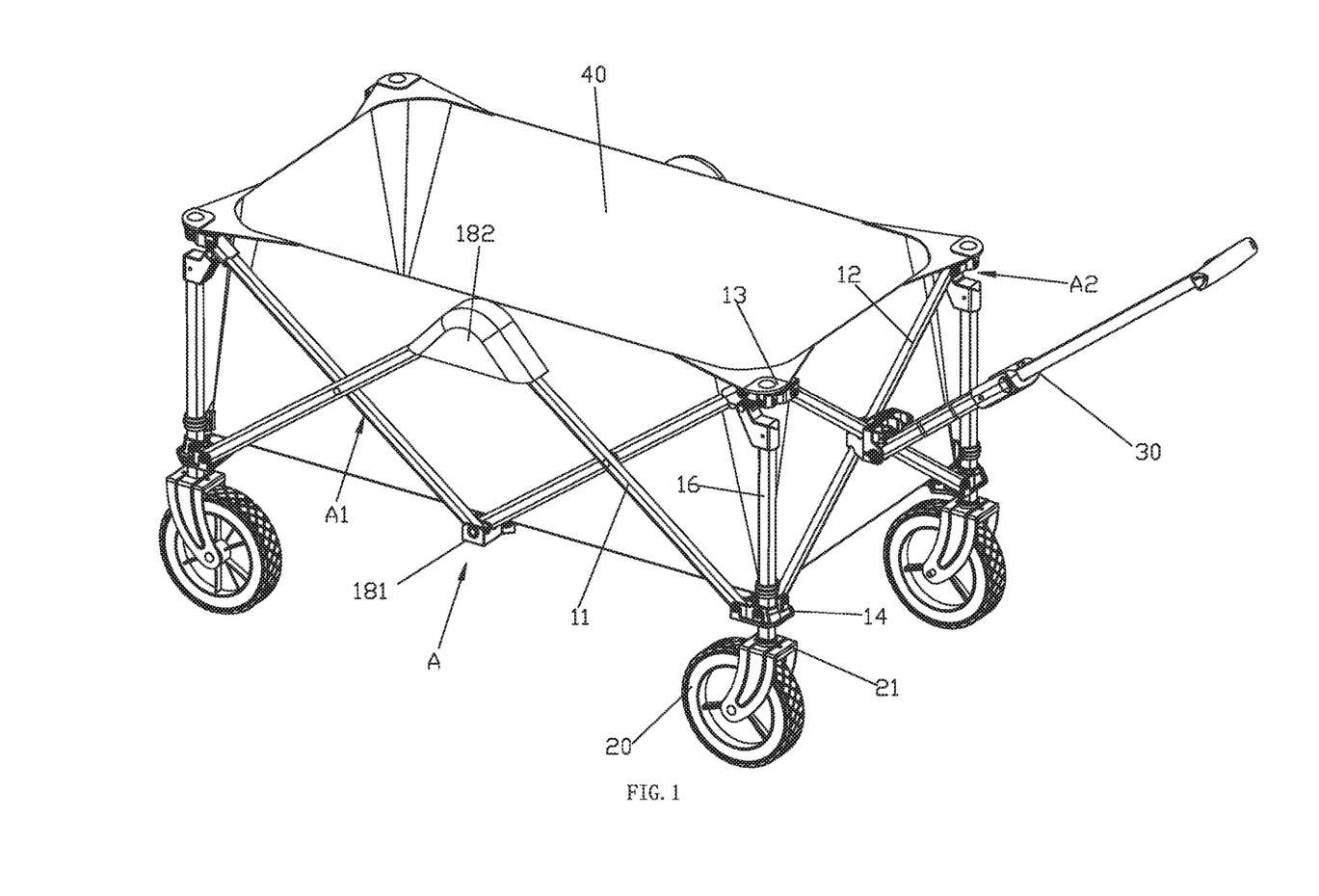
FIG. 1 illustrates a first schematic diagram of a portable folding wagon of the present invention.
Figure 2:
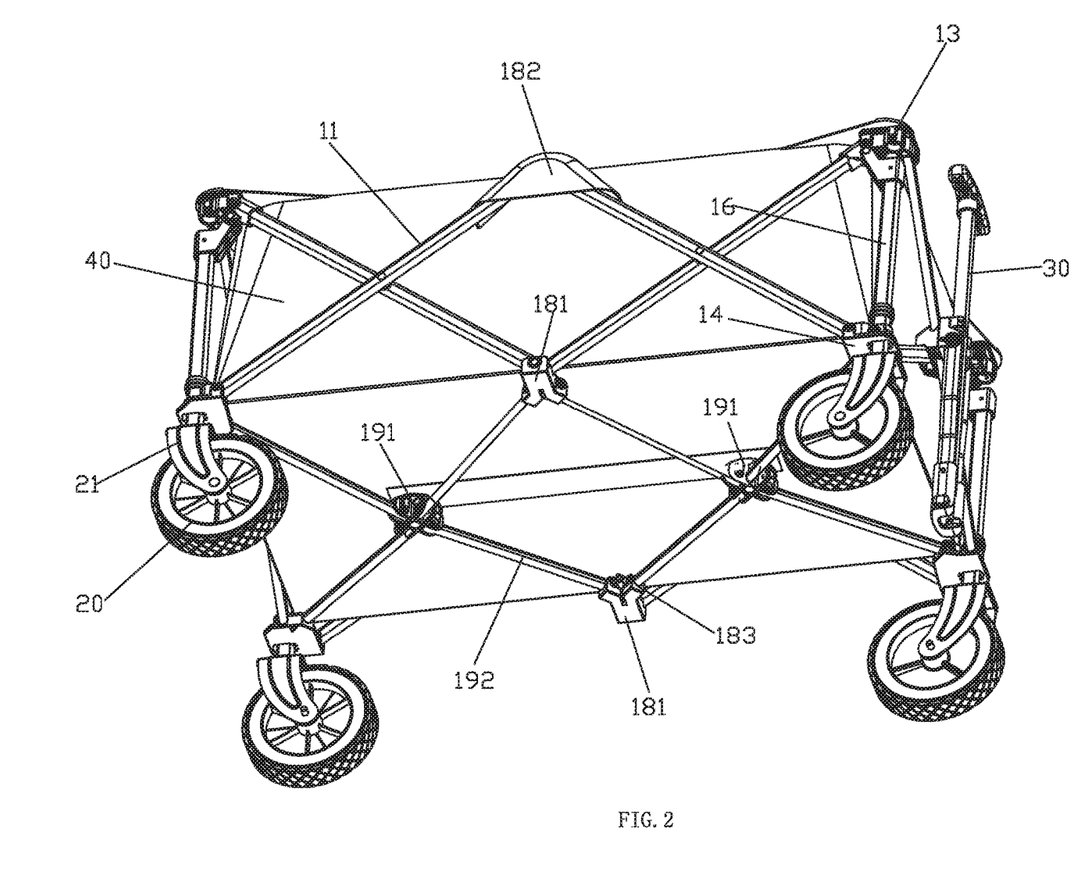
FIG. 2 illustrates a second schematic diagram of the portable folding wagon of the present invention.
Figure 3:
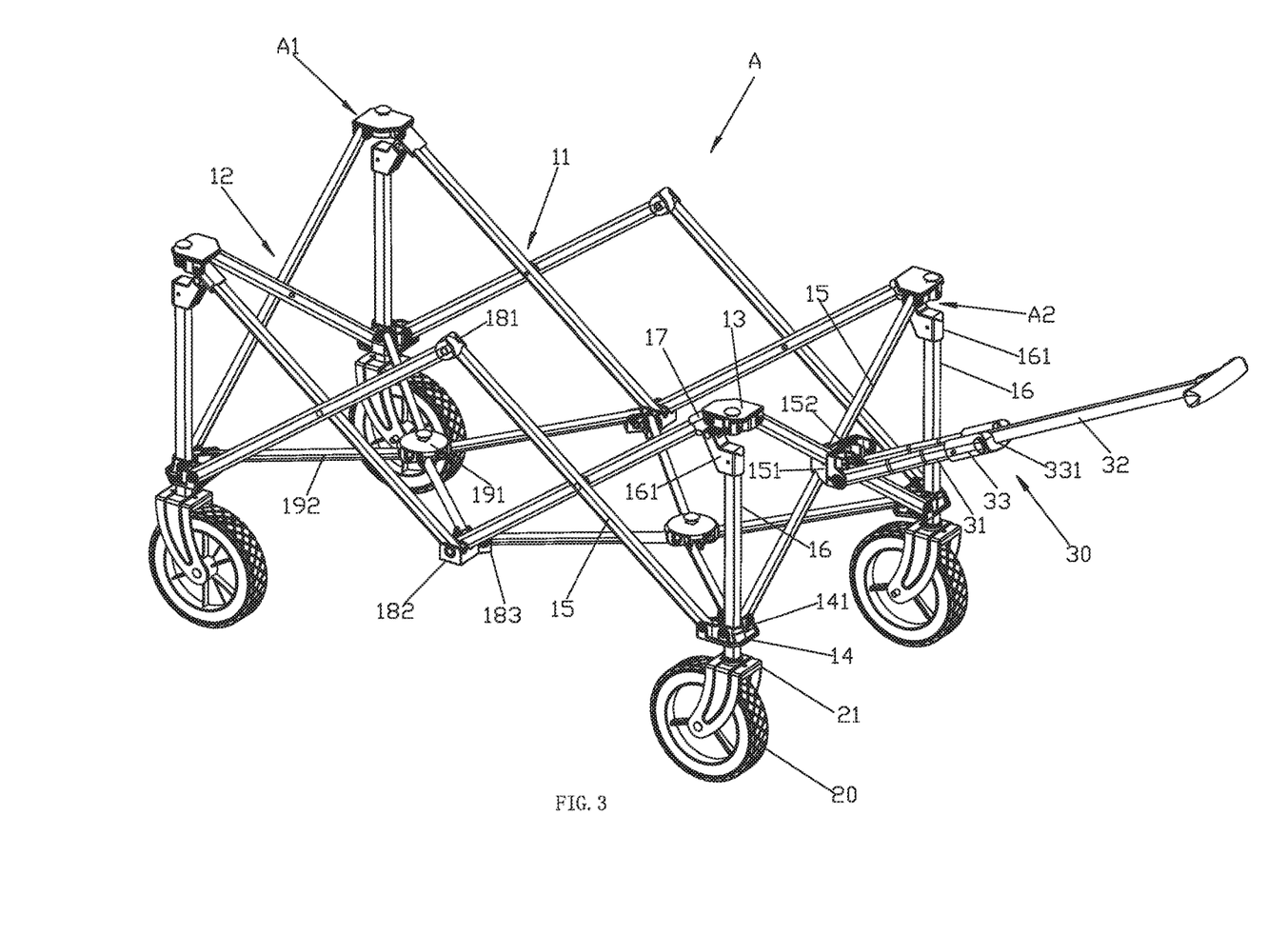
FIG. 3 illustrates a schematic diagram of the wagon frame of the present invention in unfolding state.
Figure 4:
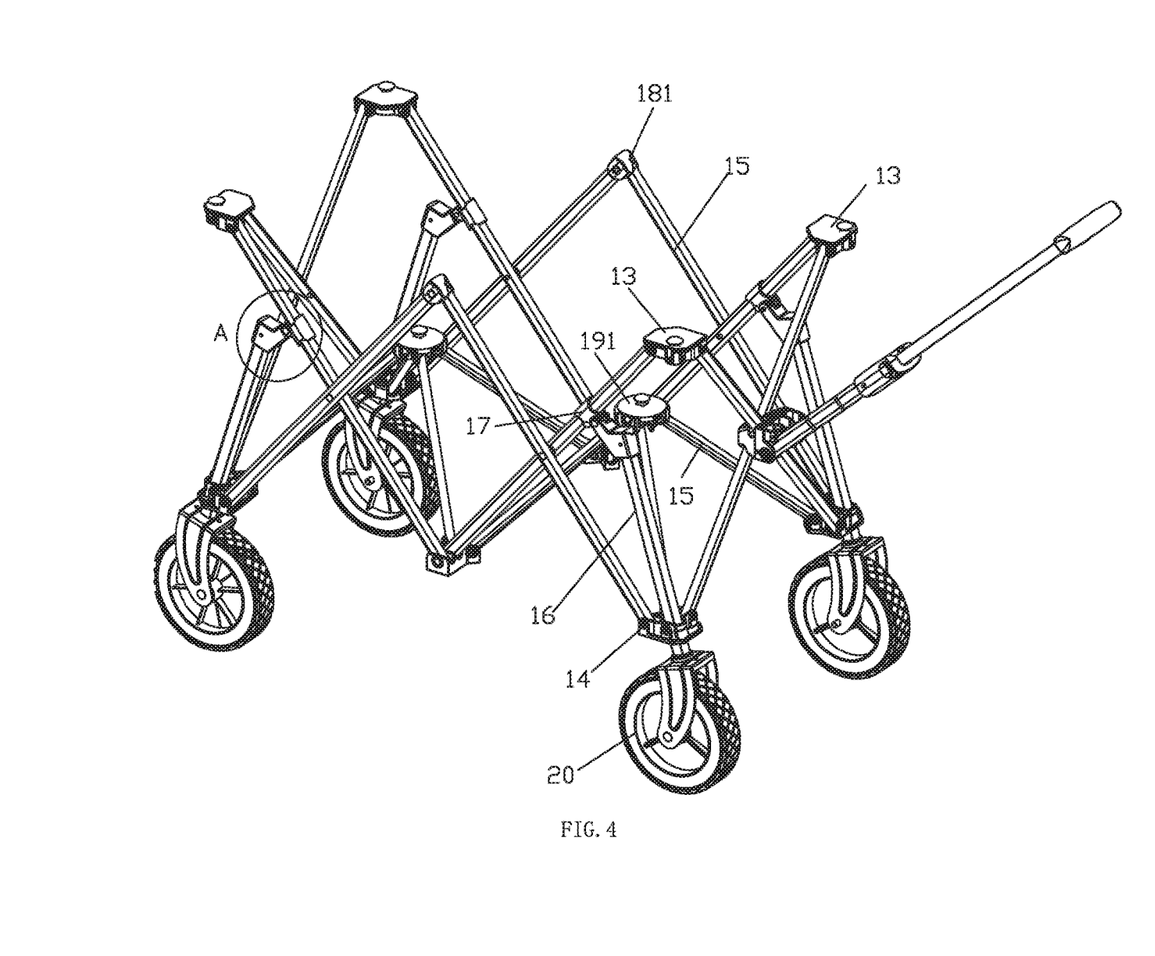
FIG. 4 illustrates a first schematic diagram of the wagon frame of the present invention in semi-folding state.
Figure 5:
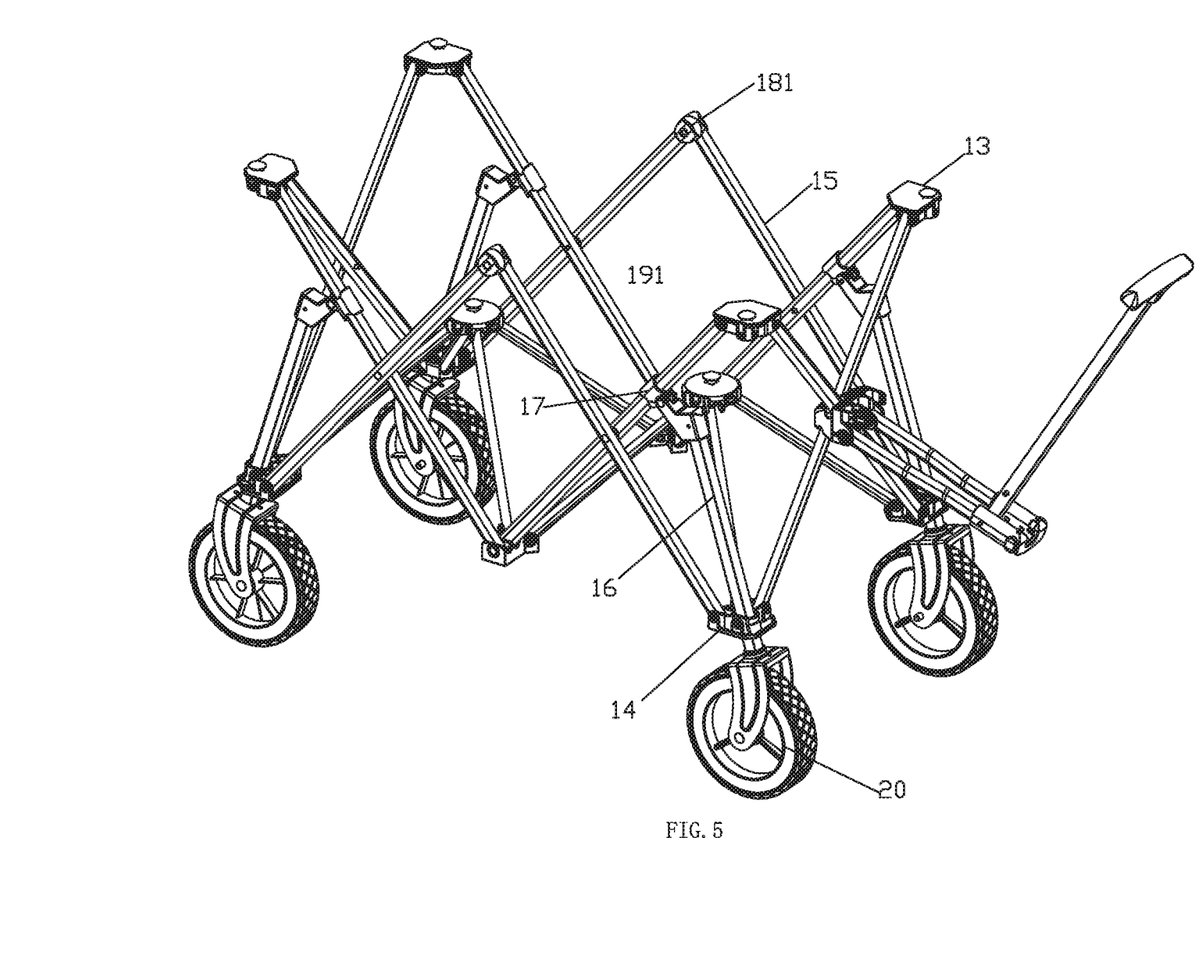
FIG. 5 illustrates a second schematic diagram of the wagon frame of the present invention in semi-folding state.
Figure 6:
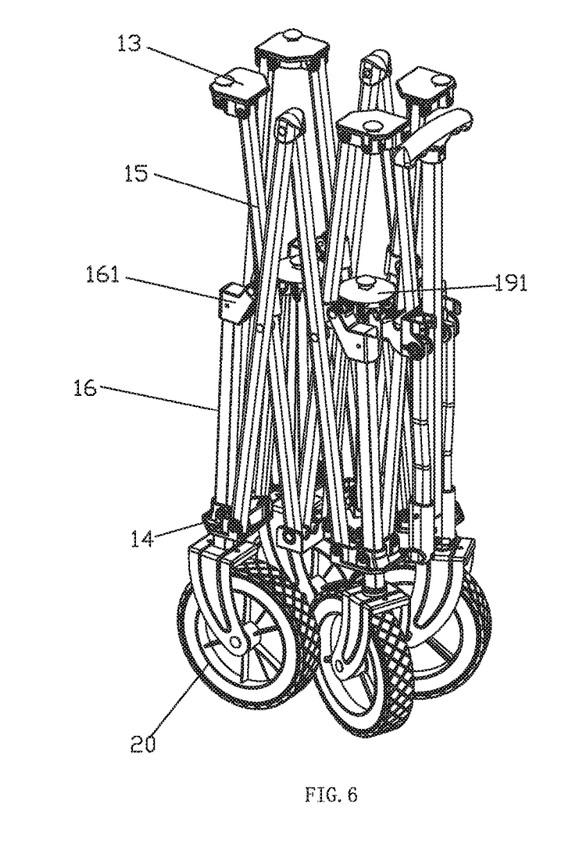
FIG. 6 illustrates a schematic diagram of the wagon frame of the present invention in folding state.

The portable folding wagon further comprises a case 40 made of flexible material, the case 40 is assembled in the folding frame. In detailed, the case 40 comprises a bottom wall and a periphery wall extending upwardly from the periphery of the bottom wall, the periphery wall is sleeved in the scissor mechanism, preferred, the periphery wall is connected to the top connecting base 13, furthermore to the second central connecting base 182. Preferred, the bottom wall of the case 40 is supported on the bottom frame. The bottom wall of the case 40 is connected to the central bases 191 of all radial mechanisms 19 for people to lift the bottom wall of the case 40 and drive the central bases 191 to move upwardly and to fold the radial mechanism 19, the radial mechanisms 19 are convenient to be folded at the same time so as to fold the folding frame; preferred, the case 40 is disposed with a handle portion on the bottom wall, the handle portion is disposed at the center of the bottom wall, so a user can fold the folding frame by pulling the handle portion.

Figure 9:
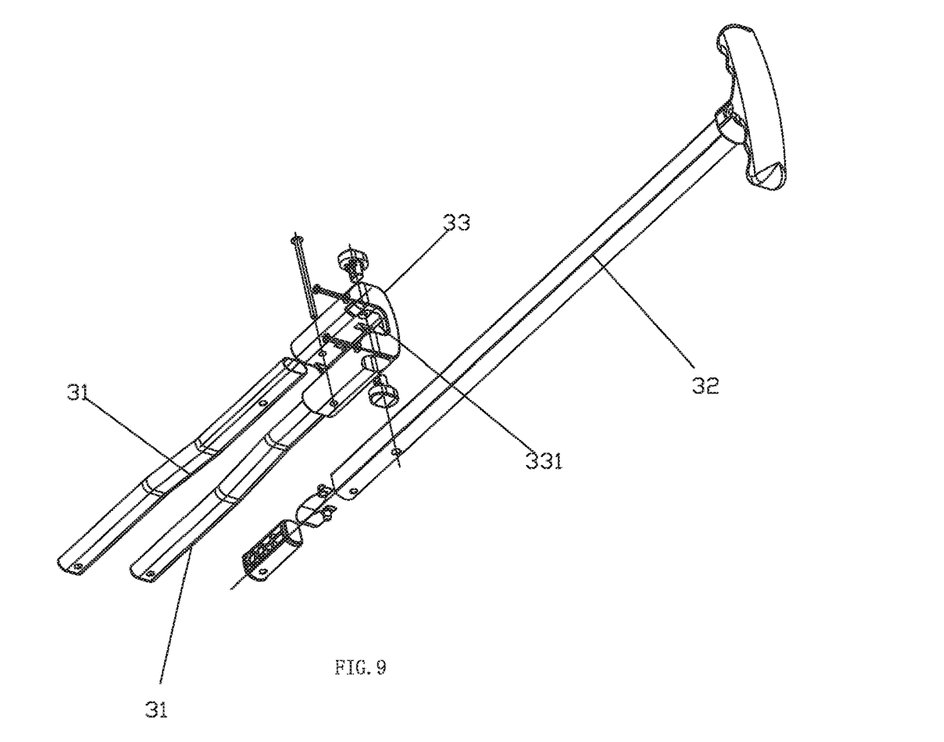
FIG. 9 illustrates an exploded and schematic diagram of the pull rod mechanism of the present invention.

Two linkage rods 15 of the scissor unit of one of the two second scissor mechanisms 12 are connected by a position base 151.

Figure 7:
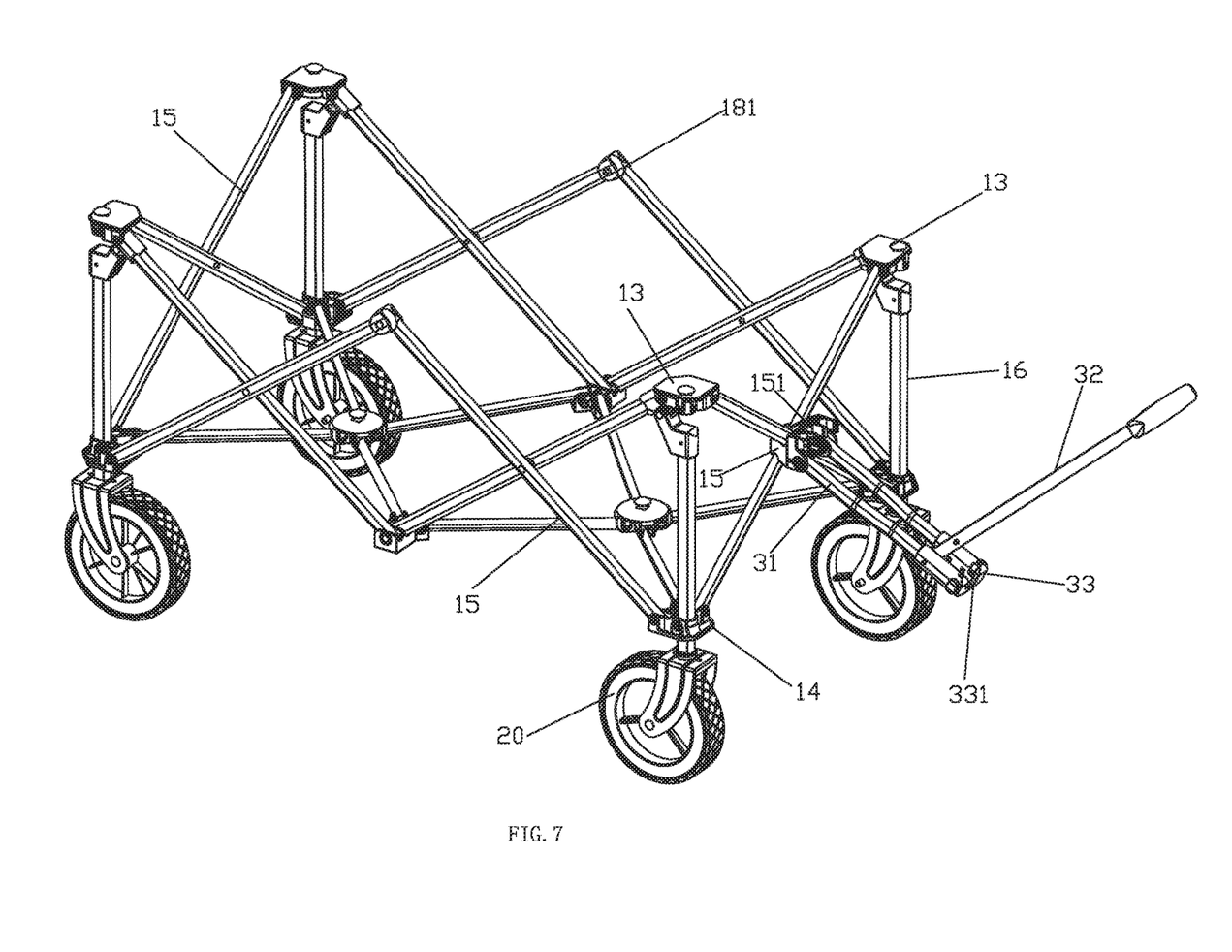
FIG. 7 illustrates a schematic diagram of the wagon frame of the present invention when the pull rod mechanism is being used.
Figure 8:
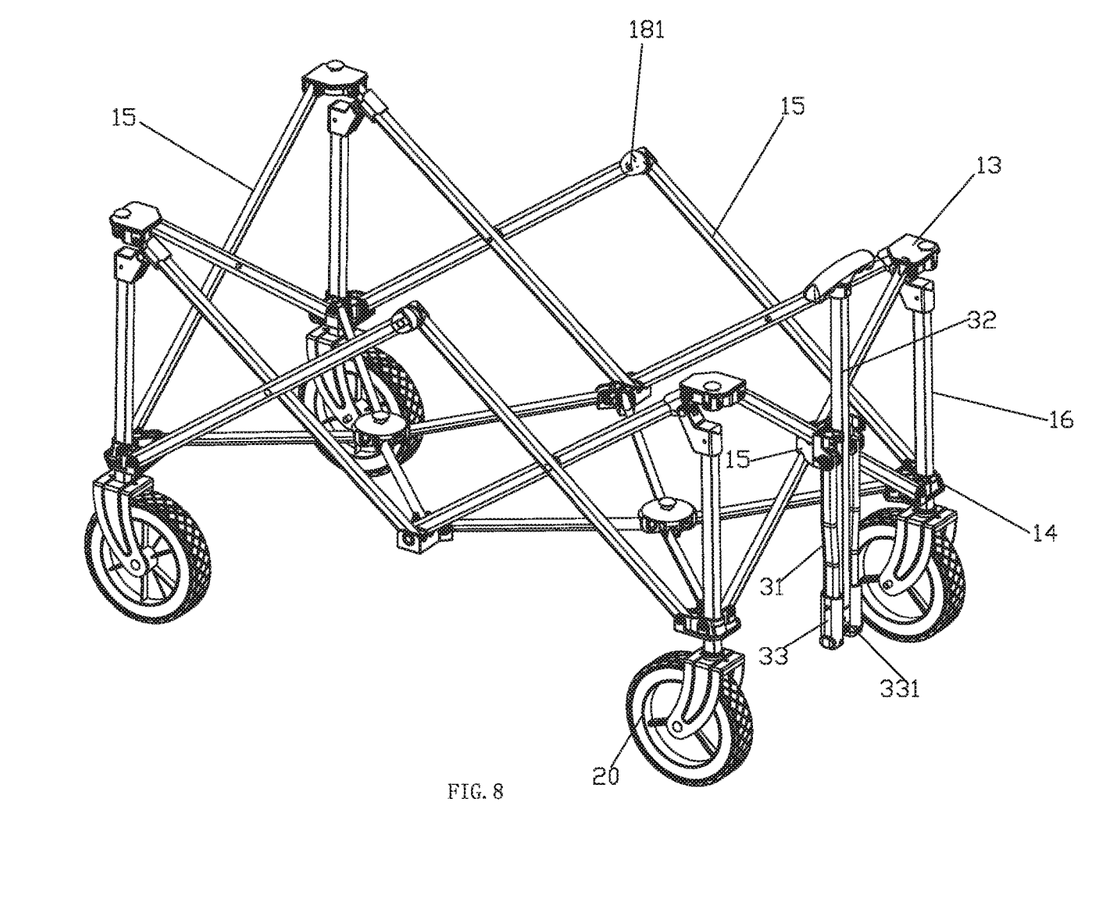
FIG. 8 illustrates a schematic diagram of the wagon frame of the present invention when the pull rod mechanism is in unfolding state.

The pull rod mechanism 30 comprises two first pull rods 31, a second pull rod 32 and an assembly base 33, the two first pull rods 31 are arranged with space; one end of the two first pull rods are rotatably connected to the position base 151, while the other end of the two first pull rods are fixedly connected by the assembly base 33; the second pull rod 32 is rotatably connected to the assembly base 33, the assembly base is disposed with a second position groove 331. By the second pull rod 32 rotating with respect to the first pull rod 31, the pull rod mechanism 30 is situated in being used state or folding state. When the pull rod mechanism 30 is being used, the first pull rod 31 can be locked in the second position groove 331 to keep in the used state, when in folding state, the first pull 31 is locked to the first position groove 150 to keep in folding state.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

The invention claimed is:

1. A portable folding wagon, comprising:
   a wagon frame, the wagon frame comprising a folding frame and wheels,
   the folding frame comprising four scissor mechanisms arranged in a rectangle,
   a scissor mechanism of the four scissor mechanisms comprising at least a scissor unit, top portions of two adjacent scissor mechanisms being rotatably connected by a top connecting base, bottom portions of the two adjacent scissor mechanisms being rotatably connected by a bottom connecting base;
   wherein
   the bottom connecting base is rotatably connected to a support rod and has a through hole,
   a top periphery of the through hole of the bottom connecting base extends upwardly to form a surrounding wall for the support rod to pass through,
   a bottom end of the support rod passes through the surrounding wall and the through hole and connects to a wheel,
   a top end of the support rod is rotatably connected to a sliding connecting piece, and
   the sliding connecting piece is slidably connected to the scissor unit of the scissor mechanism.

2. The portable folding wagon according to claim 1, wherein:
   the scissor unit comprises two linkage rods, each having a central portion, the central portions being rotatably connected;
   the four scissor mechanisms include two first scissor mechanisms arranged left and right and two second scissor mechanisms arranged front and back; and a top portion of the linkage rod of the scissor unit of the first scissor mechanism corresponding to a corner of the rectangle is slidably connected to the sliding connecting piece.

3. The portable folding wagon according to claim 2, wherein:
the top connecting base comprises two top rotating joints arranged in a right angle, the two top rotating joints being respectively rotatably connected to a top end of one linkage rod of the first scissor mechanism and a top end of one linkage rod of the second scissor mechanism;
the bottom connecting base comprises two first bottom rotating joints arranged in a right angle;
the two first bottom rotating joints are respectively rotatably connected to a bottom end of one linkage rod of the first scissor mechanism and a bottom end of one linkage rod of the second scissor mechanism.

4. The portable folding wagon according to claim 1, wherein
the top end of the support rod is fixedly disposed with a fixing base,
the fixing base has a lug,
the lug is rotatably connected to the sliding connecting piece,
a top end of the lug is disposed on a top surface of the fixing base, and
a gap is formed between the top connecting base and the top surface of the fixing base when the folding frame is unfolded.

5. The portable folding wagon according to claim 2, wherein
a first scissor mechanism of the two first scissor mechanisms comprises at least two scissor units arranged front and back, and
a second scissor mechanism of the two second scissor mechanisms comprises at least one scissor unit.

6. The portable folding wagon according to claim 5, wherein:
lower portions of two adjacent scissor units of the first scissor mechanism are rotatably connected by a first central connecting base;
top portions of the two adjacent scissor units are rotatably connected by a second central connecting base;
the folding frame further comprises a bottom frame and the bottom frame comprises radial mechanisms arranged front and back with a same number as the scissor units of the first scissor mechanism,
a radial mechanism of the radial mechanisms comprises a central base and four bottom rods rotatably connected to the central base, and
an end of a bottom rod of the four bottom rods of the radial mechanism is rotatably connected to the first central connecting base or the bottom connecting base correspondingly.

7. The portable folding wagon according to claim 6, wherein the first central connecting base is connected to the end of one bottom rod of two adjacent radial mechanisms at a same time.

8. The portable folding wagon according to claim 7, wherein
the first central connecting base comprises two second bottom rotating joints and two central rotating joints,
the two second bottom rotating joints are respectively rotatably connected to a bottom portion of one linkage rod of the two adjacent scissor units, and
the two central rotating joints are respectively rotatably connected to the end of one bottom rod of two adjacent radial mechanisms.

9. The portable folding wagon according to claim 8, wherein
the two second bottom rotating joints are arranged right and left, and
the two central rotating joints are fixedly disposed respectively at sides of the two second bottom rotating joints and formed to be splayed.

10. The portable folding wagon according to claim 6, further comprising a case made of flexible material, the case being assembled to the folding frame and supported on the bottom frame, and the case and the central base of the radial mechanism are connected.

11. The portable folding wagon according to claim 2, further comprising:
a pull rod mechanism;
wherein
the two linkage rods of the scissor unit of one of the two second scissor mechanisms are connected by a position base;
the position base has a first position groove;
the pull rod mechanism comprises a first pull rod, a second pull rod rotatably connected to the first pull rod, and a second position groove;
the first pull rod is rotatably connected to the position base; and
the first position groove and the second position groove are coupled in shape.

12. The portable folding wagon according to claim 11, wherein:
the pull rod mechanism comprises two first pull rods and an assembly base;
the two first pull rods are arranged spaced apart;
one end of each of the two first pull rods is rotatably connected to the position base;
another end of each of the two first pull rods is fixedly connected to the assembly base;
the second pull rod is rotatably connected to the assembly base; and
the second position groove is disposed at the assembly base.

\* \* \* \* \*